SYSTEM FOR BROADCASTING ELECTROMAGNETIC WAVES

Filed July 9, 1958 4 Sheets-Sheet 1

INVENTOR
HILLIS W. HOLT

BY Chapin & Neal

ATTORNEYS

INVENTOR
HILLIS W. HOLT

BY Chapin & Neal
ATTORNEYS

INVENTOR
HILLIS W. HOLT

BY Chapin & Neal
ATTORNEYS

INVENTOR
HILLIS W. HOLT

BY Chapin & Neal

ATTORNEYS 3,037,112
SYSTEM FOR BROADCASTING ELECTROMAGNETIC WAVES

Hillis W. Holt, West Hartford, Conn., assignor, by direct and mesne assignments, to Conarb Corporation, Greenfield, Mass., a corporation of Massachusetts Filed July 9, 1958, Ser. No. 747,494
4 Claims. (Cl. 250—17)

Figure 1:
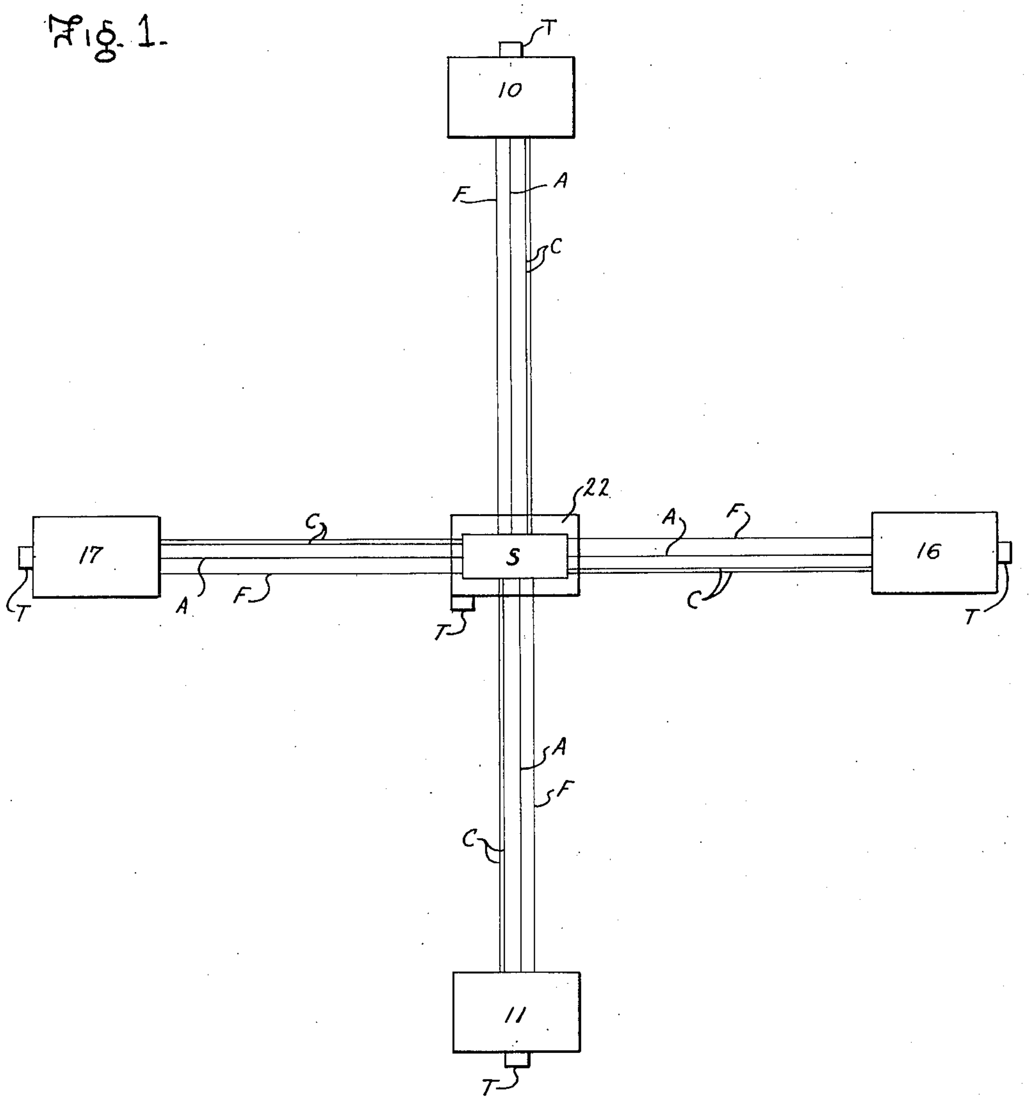

This invention relates to improvements in the broadcasting of electromagnetic waves.

At present the usual broadcasting station serving a given area comprises a single broadcasting facility operating on an assigned frequency and power output. Because of the limited number of available frequencies and the large number of areas desiring and entitled to local broadcasting service, a number of stations must operate on the same frequency and the power output assigned to such stations must be so limited that no material interference between the signals of the several stations result.

Under these conventional broadcasting procedures and considering the operation of two stations operating on the same frequency it is obvious that an area inevitably exists between them where the signal strength from either station is inadequate for good reception. If power output is increased, the resulting interference is equally destructive of good reception. As will also be obvious high signal strength is present in each station service area only adjacent that station, since signal strength drops off rapidly as the distance from the station increases. Thus between the service areas of the two stations there is an area where "service" is substantially non-existant and within each service area there is a peripheral portion of substantial extent in which reception is unsatisfactory.

Various forms of multiple antennae directional or otherwise have been proposed but have failed to provide a practical solution to the problem.

The general object of the present invention is to overcome the above difficulties and provide a field of reception limited in extent but with a greater uniformity of signal intensity than is possible under present practice. Stated in another way this object is the provision of ways and means of greatly increasing local signal strength and greatly increasing the effective local area of broadcasting stations without increasing, and with the possibility of actually decreasing the interference with the operation of other stations at a distance on the same channel.

A further object is to secure this increase in local signal strength by increasing the number of transmitters rather than increasing the power of a single transmitter, thus making possible the non-conflicting assignment of the same frequency or channel to a greater number of stations and providing a wider range of nationwide broadcasting services.

Other and further objects and advantages of the invention will be made apparent in the following specification and claims.

In general the present invention proposes a system for broadcasting electromagnetic waves which employs a plurality of transmitting facilities operating individually with a low power output on a common frequency or channel, these facilities being spaced to give local signal strength throughout the service area which would under conventional practice be served by a single facility, the several facilities operating with equal power outputs.

As later fully explained the concept of the invention requires at least four facilities, preferably five or more, spaced from each other, and one of the facilities being located within a polysided geometric figure defined by the other of said facilities. The carriers of the several facilities are modulated to provide a common modulated signal and where necessary or as found desirable a predetermined phase relationship is established and maintained between the signals of the several facilities.

Figure 2:
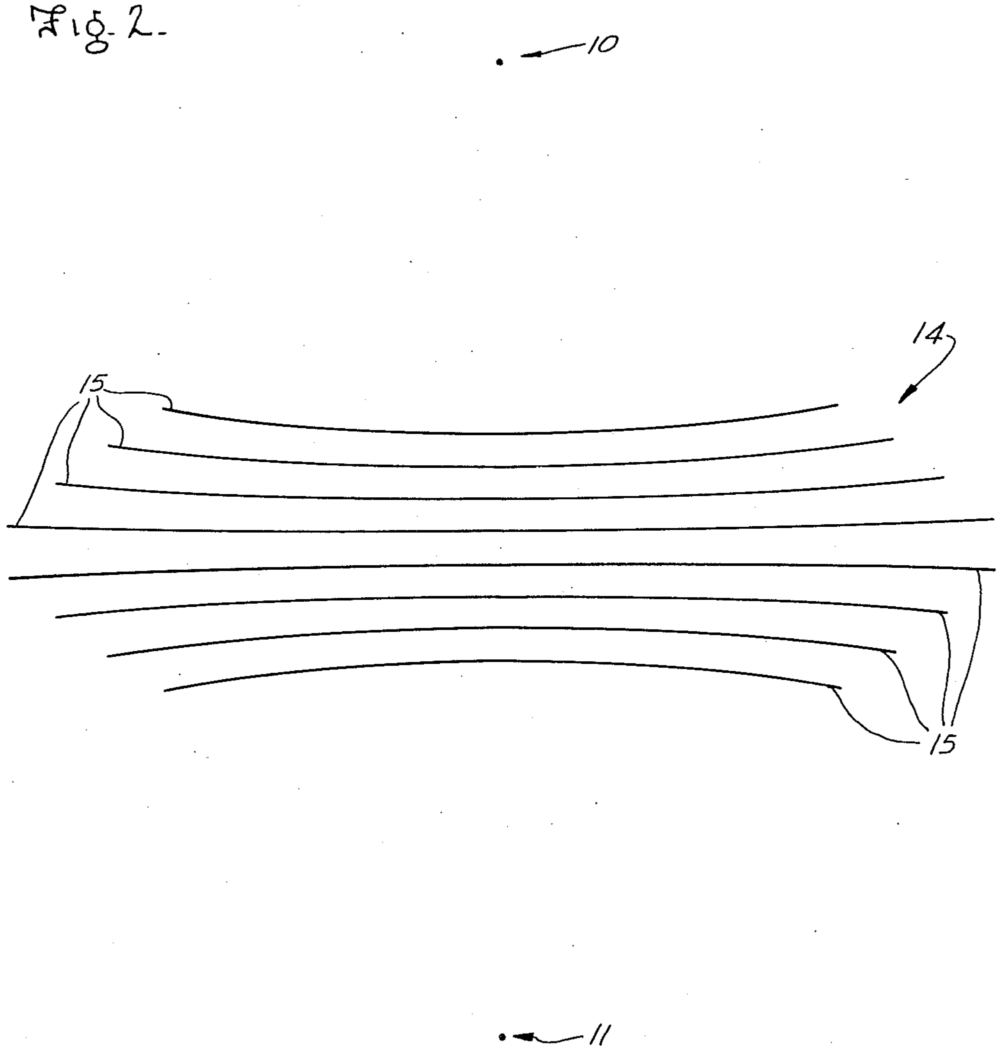
Figure 3:
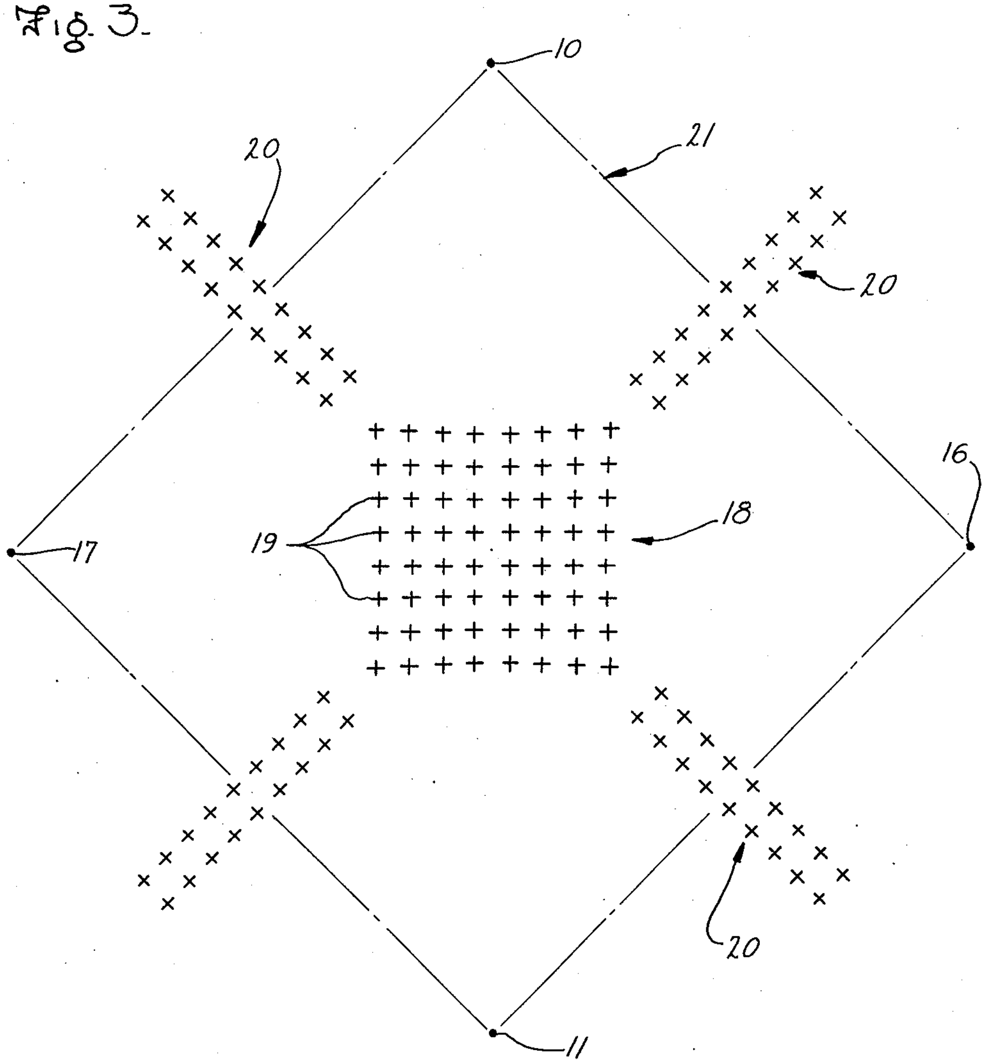
Figure 4:
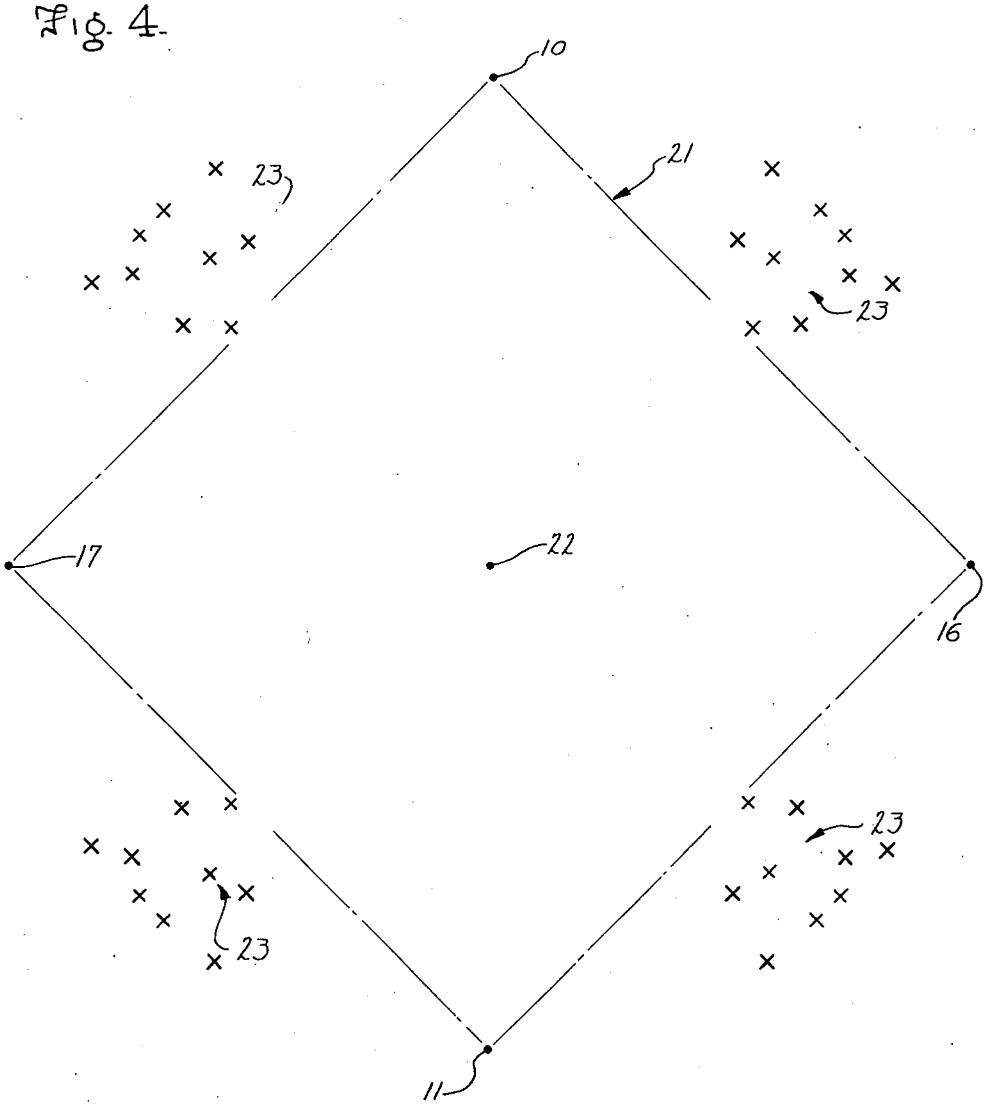

In the accompanying drawings,

FIG. 1 is a diagrammatic view showing a five facility embodiment of the invention; and FIGS. 2, 3 and 4 are diagrammatic views showing the characteristic interaction of carrier waves from adjacent stations, and the manner in which these characteristics are taken advantage of by the arrangement of the facilities in accordance with the present invention.

In part, the concept of the invention arises from the fact that the common practice of plotting the attenuation curves, or distance vs. field intensity, on log-log coordinate paper gives a misleading curve. When the attenuation curve was plotted linearly it becomes apparent that the decrease in signal strength in the first mile is of the order of 1000 to 1 while the decrease in signal in the 35th mile is of the order of 1 to 1.05. An appreciation of this fact leads to new and important conceptions with respect to the effect spaced facilities transmitting at a common frequency may have on each other.

The present invention is in certain aspects a projection of the booster system to the point where the objections of the system are removed. However, the conventional use of booster stations has been in many cases abandoned, and it is helpful to an understanding of the present invention and its essential departures from booster operation as such, to consider the limitations of the booster system and the reasons for the discontinuation of booster operation.

Referring to FIG. 2 two transmitting facilities are indicated at 10 and 11, respectively, which it is assumed are transmitting on a common frequency with equal power output.

It is obvious that in the immediate vicinity of one of the transmitting facilities there will be no adverse effect from the other facility, since the relative signal strength or field intensity will be so great as to override the effect of the facility at a distance, even at a relatively short distance. However, at a point about half way between the transmitting facilities, there are several things which occur. If the radio frequency output of the two facilities are in isochronism; that is, if they are in synchronism and in phase, the signal at this point will be double that for one transmitting facility alone. If they are in synchronism, but exactly out of phase, then the radio frequency signal will be reduced to zero, but only for that area where the field intensities are equal. Wherever the two signals are unequal, some radio frequency signal will remain. If we now assume that the transmitting facilities are operating in phase, and if we examine the total field, it is found that in spite of the fact that the signals are in phase, at a point between the facilities there is a large number of points representing an area 14 indicated by the heavy lines 15 (the center line of which area is halfway between the transmitting facilities and perpendicular to the line connecting the two facilities) where the signals are equal and exactly out of phase. An important part of the invention is the recognition that this is due to the fact that the signals are traveling in opposite directions. Thus this large area 15 contains a large number of points where the signal is unsatisfactory. Since most radio receivers require the carrier for proper operation, a distorted signal results at the output of the receiver.

If a third and fourth transmitting facility is added, operating on the common frequency and with power output each equal to those of facilities 10 and 11, as indicated in FIG. 3 at 16 and 17, respectively, the effective interference in the intermediate area 14 of FIG. 2 is greatly lessened, this line of interference being reduced to points 19 as indicated in the area 18, FIG. 3, and the points within the area where the field intensities total zero materially decrease. The field in the immediate vicinity of the added facilities 16 and 17 will be so great as to override the other's signals and in the areas where the signals are approximately equal the points of unsatisfactory operation will occur only at those points where the total field intensity approaches zero.

The addition of the facilities 16 and 17 introduce areas 20 extending at right angles between the facilities 10—16, 16—11, 11—17 and 17—10. However, assuming the ideal arrangement in which the facilities 10, 17, 11 and 16 define the corners of a square, as indicated at 21, the decreased distance between the facilities at the corners of the square results in a substantially reduced area of interference as compared with diagonally opposite facilities.

If a fifth equal facility 22 is added and centrally located within the square 21 as in FIG. 4, the number of points where the signals add to zero, or exactly cancel, will be reduced substantially to the vanishing point as indicated at 23 and if the signals do reduce to zero at any critical point, then the location of that point can be shifted by changing the phase of one of the transmitting facilities.

With the addition of a sufficient number of transmitting facilities, the need for controlling the phase disappears. This is because the field in the vicinity of each facility is strong enough to override the signals from the other facilities, and the number of points where a large number of signals exactly cancel out will be decreased as a power of the number of facilities. If the facilities are controlled as to phase, then the points of cancellation will remain stationary, but if the facilities are allowed to change frequency slowly at random, the complete cancellation at any given point will occur for a very short period of time.

In other words, the more transmitting facilities used the more efficient the area coverage, and the less the necessity for radio frequency phase control.

It is also helpful to consider the differences in theory and practice with respect to directional antenna systems and the concepts and practice of the present invention. In order to produce a directional antenna it is necessary to have two strong fields, and the maximum directivity is obtained when the fields are equal and for this and other reasons the distance in a directional antenna system between the two facilities, aligned for directional purposes, is very small and of the order of several eighths of wave lengths. In the system of the present invention the several facilities are spaced apart a matter of miles. In a directional antenna system the two facilities involved are so close together that the characteristics of the field between them is of no importance and is no part of the service area as such. In the purposes of the present invention the characteristics of the field between the facilities is of essential importance and such small directional effects as may result from the relative arrangement of the facilities is of secondary importance and functional only as it imparts a degree of flexibility to the system with respect to service area boundaries. It is here for the first time purposefully recognized that signals traveling in opposite directions cannot be synchronized—that is their strength cannot be added, or subtracted. Considering what relatively directional effect is present in the system of the invention as presented in FIG. 4, such signal intensification as is effective, for example, from the synchronization of the signals of facilities 11 and 22 in the area between facilities 22 and 10, and from the synchronization of facilities 11, 22 and 10 in the area beyond facility 10, where their signals travel in the same direction, is balanced by the relative directional effect in the opposite direction, that is, in the areas between 22 and 11 and outwardly of 11, where the signals from 10, 22 and 11 travel in the same direction. The same is true of the facilities 17, 22 and 16, and 16, 22 and 17. Thus the substantial uniformity of signal strength in the overall service area is achieved while minimizing interference with stations at a distance and operating on the same frequency.

The concept of the system of the invention may be analyzed in simple terms. Let us assume two waves of slightly different frequencies traveling in the same direction—the resulting wave adds and subtracts at a slow rate determined by the difference in frequency, known as a beat. Assuming the two waves, traveling in the same direction, are on the same frequency—the resulting wave, depending on the phasing is the sum or the difference (no wave at all) or something in between.

When, however, we assume two waves traveling in opposite directions on the same frequency the waves add and subtract in a manner to result in a wave which changes from double to zero every ½ wave length. Thus considering two stations broadcasting on the same frequency—in the area between the stations the signal adds and subtracts at a rapid rate, but in the areas beyond the two stations, depending on the phasing, the wave is the vector sum of the two waves—resulting in no signal if the waves are out of phase and in double signal if in phase. FIG. 2 represents a plan view of what happens when the two stations are located several miles apart to position a portion of their reception or service area between them. Neglecting for the moment the difference in wave strength due to distance from the antenna, the waves from stations 10 and 11 cancel out at the lines 15 and are of double intensity between the lines—if the stations are on the same frequency the lines remain stationary—if the stations are on slightly different frequencies the lines move slowly at a rate depending on the frequency difference. In the general area 14 the waves are traveling in opposite directions. In the areas outwardly beyond stations 10 and 11 and outwardly to the right and left of the area 14 the waves travel in the same direction and thus produce no lines of cancellation but a constant field the intensity of which depends on the phase—if the waves are controlled so as to be out of phase there will be no field in these outer areas and if controlled so as to be in phase the field in these outer areas will be doubled.

FIG. 3 represents a plan view of what happens if four stations are similarly spaced. In the area 18 between the stations 10—11 and 16—17 there are two sets of two waves traveling in opposite directions, at right angles to each other. The lines of cancellation within the area defined by the four stations now become dots since there is complete cancellation only where the lines cross as at 19. In the area outwardly of the area defined by the four stations the signals travel in the same direction and the resulting signal is the vector sum of the four signals—if they are controlled so as to be in phase the signal will be the sum of the four signals but if they are controlled so as to be two in phase and two out of phase the result will be no signal outside of the defined area between the stations.

FIG. 4 represents a plan view of what happens if a fifth station 22 is added and positioned within the area defined by the four stations 10, 16, 11 and 17. The fifth station 22 will fill in substantially all of the dots of cancellation within the defined area, and only a few dots, as at 23 will be present outside of the area. If the signals are phased so that in the areas outside of the defined area (where the signals travel in the same direction) the vector sum of all the signals is zero and the ultimate aim of the invention has been ideally achieved, namely a system of radio transmission with strong signals within the system but with no signal outside of the system.

We must, however, reintroduce consideration of the decrease in signal strength with distance from the station in its effect on the approximation of the ideal. The phasing of the stations so that the total field outside of the station defined area is very low requires that the point of measurement be a sufficient distance outside the station defined area, at a point where all signals approach practically from the same direction and are about the same intensity. No difficulty is encountered in thus reducing the signal to a very low level in a single direction and with the signal so reduced it is, under uniform conditions of terrain, etc., reduced in all directions, assuming symmetry in the system. However, the signal can be reduced non-uniformly as to several directions as found desirable or necessary by intentional variations in the spacing of the stations as well as by controlling the phase relations within the system or a combination of the two.

It will be understood that while the "ideal" arrangement illustrated in FIG. 4, that is with facilities located at the corners of an equal sided geometrical figure with a facility at the center of such figure, may seldom fully obtain in actual practice, its approximation secures, under normal terrain conditions, the maximum uniformity for a given installation. It will further be understood that a similar arrangement of four, or more, facilities in which one of the facilities is positioned within a geometrical figure defined by the others is within the invention and that in general the system is most efficient in providing a uniform limited service area when the arrangement is symmetrical. It is, however, within the concept of the invention to purposefully depart from symmetry to secure maximum uniformity consistent with terrain limitations.

In FIG. 1 is diagrammatically shown the physical features of a five facility installation conforming to the arrangement of the facilities 10, 16, 11, 17 and 22 in FIG. 4.

Each of the transmitting facilities will comprise a standard transmitter including the usual tower, antenna, coupling unit, ground system, with suitable housing for the equipment. Each facility will be designed and equipped to operate at the same frequency and with equal power outputs. Each facility will be remotely controlled from the studio which may be located at one of the facilities as indicated at S in FIG. 1 or it may be housed in a separate building at any desired location within reasonable distance from the several transmitting facilities.

An audio line A, two remote control lines C and a frequency control line F will connect each facility with the station S. The lines A and C can usually be supplied by the local telephone company and lines F may be similarly supplied if the telephone line meets technical requirements—otherwise special concentric lines or micro-wave links will be used. If the audio lines A to the several facilities vary materially in length and are sufficiently long to produce appreciable time delay, artificial delay lines may be installed in certain of the shorter lines to equalize the delay and properly modulate all of the transmitting facilities simultaneously.

The usual controls at the central studio and the control devices at the several facilities which are remotely controlled from the central studio may be of any standard or suitable form, consistent with the specific type of transmitting facilities being employed and the character of the waves being broadcast. Consistent with the purposes above described phase control for each transmitting facility remotely controlled from the studio or other central control center is provided. Monitoring and other devices as needed are provided at the several facilities or the central control center. In other words the facilities as such and their equipment will conform to the character of the broadcasting service and the invention is not limited to any particular type of service, within the scope of the appended claims.

What is claimed is:

1. A broadcasting system for uniformly servicing a prescribed service area which comprises a plurality of relatively low powered program broadcasting transmitters, at least three in number, substantially spaced from each other within the prescribed service area, and disposed to define a polysided geometric figure, and an additional program broadcasting transmitter disposed within said geometrical figure and located in the area of maximum cancellation of the waves propagated from the transmitters defining said geometrical figure, said program broadcasting transmitters including the one located within said geometrical figure adapted to simultaneously broadcast carrier waves of the same frequency, means to simultaneously modulate the carrier waves emanating from each of said transmitters, including the one located within said geometric figure, with the same program signal, a common control center and means remotely controlled from said center for independently controlling the phase relationship of carrier waves emanating from each of said transmitters including the one located within said geometric figure.

2. A combination for broadcasting program modulated electromagnetic waves of substantially uniform signal intensity over a prescribed limited service area which comprises, a plurality of program broadcasting facilities, at least three in number substantially spaced from each other within said prescribed service area and defining a polysided geometrical figure, and an additional program broadcasting facility located within said geometrical figure, each of said program broadcasting facilities, including said additional program broadcasting facility, adapted to simultaneously broadcast carrier waves of the same frequency and power output independently of the others, means to simultaneously modulate the carrier waves emitted from each of said program broadcasting facilities, including said additional program broadcasting facility, with the same program signal, frequency control means at each of said program broadcasting facilities, including said additional program broadcasting facility, for independently controlling the frequency of the carrier wave emitted from that facility, phase control means at each of said program broadcasting facilities, including said additional program broadcasting facility, a common control center, and means for independently actuating the frequency control means and the phase control means at the several program broadcasting facilities, including said additional program broadcasting facility, from said common control center.

3. The method of broadcasting programmed electromagnetic waves of uniform quality throughout a prescribed broadcasting service area which comprises, simultaneously broadcasting identical modulated waves from a plurality of transmitters, at least three in number substantially spaced from each other within said prescribed service area and arranged to define a polysided geometrical figure, locating that area within said polysided figure within which maximum cancellation of the waves propagated by said transmitters occur, positioning an additional broadcasting transmitter within said area of cancellation, and broadcasting therefrom modulated waves, identical with those being broadcast from the transmitters defining said geometrical figure and simultaneously therewith.

4. The method set forth in claim 3 including the step of phasing the waves propagated by the several transmitters to substantially null the broadcast signal propagated by the several transmitters, outwardly of the boundary of said prescribed service area.

References Cited in the file of this patent

UNITED STATES PATENTS

| | | |
|---|---|---|
| 1,751,516 | Green | Mar. 25, 1930 |
| 2,033,271 | Aiken | Mar. 10, 1936 |
| 2,036,383 | Affel | Apr. 17, 1936 |
| 2,238,269 | Koschmieder | Apr. 15, 1941 |

FOREIGN PATENTS

| | | |
|---|---|---|
| 270,273 | Great Britain | Aug. 11, 1927 |

OTHER REFERENCES

Pub. I Radio Engineering, December 1931, pages 26–29, Wireless Synchronization by V. V. Gunsolley.

Pub. II Electronics, September 1954, pages 142–143, Frequency Control for Multiple Transmitters by R. Flory.